(12) United States Patent
Krackhardt et al.

(10) Patent No.: US 9,476,311 B2
(45) Date of Patent: Oct. 25, 2016

(54) VARIABLE-PITCH PROPELLER OR REPELLER

(75) Inventors: Ernst-Christoph Krackhardt, Schenefeld (DE); Christian Norbert Müller, Witzhave (DE); Dierk Schröder, Selent (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 927 days.

(21) Appl. No.: 13/816,794

(22) PCT Filed: May 11, 2011

(86) PCT No.: PCT/EP2011/057607
§ 371 (c)(1),
(2), (4) Date: Feb. 13, 2013

(87) PCT Pub. No.: WO2012/022501
PCT Pub. Date: Feb. 23, 2012

(65) Prior Publication Data
US 2013/0142653 A1 Jun. 6, 2013

(30) Foreign Application Priority Data
Aug. 17, 2010 (DE) .................. 10 2010 039 394

(51) Int. Cl.
*F01D 7/00* (2006.01)
*F03D 7/02* (2006.01)
*B63H 3/06* (2006.01)

(52) U.S. Cl.
CPC *F01D 7/00* (2013.01); *B63H 3/06* (2013.01); *F03D 7/0224* (2013.01); *F05B 2210/16* (2013.01); *F05B 2260/79* (2013.01); *Y02E 10/721* (2013.01); *Y02E 10/723* (2013.01)

(58) Field of Classification Search
CPC .......... F03D 7/0224; F01D 7/00; B63H 3/06
See application file for complete search history.

(56) References Cited

U.S. PATENT DOCUMENTS 2,370,135 A  2/1945  Berliner
2,446,658 A  8/1948  Maynard
(Continued)

FOREIGN PATENT DOCUMENTS

AU  2003264087 A1  3/2005
DE     712882 A    11/1941
(Continued)

OTHER PUBLICATIONS

International Search Report PCT/ISA/210 for PCT/EP2011/057607, dated Oct. 28, 2011.
(Continued)

*Primary Examiner* — Woody Lee, Jr.
(74) *Attorney, Agent, or Firm* — Harness, Dickey & Pierce, P.L.C.

(57) ABSTRACT

In the case of a variable-pitch propeller or repeller according to the invention, the pitch-adjusting device is arranged in the hub and formed in such a way that it allows only a numerically limited number of different blade pitches, preferably just two blade pitches, for which purpose the pitch-adjusting device comprises an electrical drive device, for moving the blades from a first blade pitch to a second of the numerically limited number of blade pitches, and an electrically actuable locking device, for locking the blades in the numerically limited number of different blade pitches.

16 Claims, 3 Drawing Sheets

(56) References Cited

U.S. PATENT DOCUMENTS

| | | | |
|---|---|---|---|
| 2,471,953 A | 5/1949 | Hamilton | |
| 4,648,345 A * | 3/1987 | Wham | B63G 8/16 114/338 |
| 4,934,901 A * | 6/1990 | Duchesneau | B64C 11/32 415/129 |
| 5,174,716 A * | 12/1992 | Hora | B64C 11/32 416/129 |
| 5,282,719 A | 2/1994 | Fitzgibbon | |
| 5,595,474 A * | 1/1997 | Girard | B64C 11/44 416/1 |
| 6,062,925 A | 5/2000 | Kurimo | |
| 6,609,889 B1 | 8/2003 | Vilsboll | |
| 2001/0051475 A1 | 12/2001 | Reuter et al. | |
| 2009/0004008 A1 * | 1/2009 | Richards | B64C 11/06 416/145 |

FOREIGN PATENT DOCUMENTS

| | | |
|---|---|---|
| DE | 939254 B | 2/1956 |
| DE | 1931158 A1 | 3/1970 |
| DE | 3118230 A1 | 1/1983 |
| DE | 235900 A1 | 5/1986 |
| DE | 291733 A5 | 7/1991 |
| DE | 19648417 A1 | 5/1998 |
| DE | 19834736 A1 | 2/1999 |
| DE | 19615046 C2 | 7/1999 |
| DE | 10135711 A1 | 2/2003 |
| DE | 102007016023 A1 | 10/2008 |
| EP | 0154808 A1 | 9/1985 |
| GB | 165132 A | 6/1921 |
| JP | S36017860 B | 9/1961 |
| JP | S63166692 A | 7/1988 |
| JP | 2005186748 A | 7/2005 |
| WO | WO 2005019642 A1 | 3/2005 |
| WO | WO 2005021374 A1 | 3/2005 |

OTHER PUBLICATIONS

Australian Office Action mailed Oct. 12, 2013.
Japanese Office Action and English translation thereof mailed Mar. 28, 2014.

* cited by examiner

VARIABLE-PITCH PROPELLER OR REPELLER

PRIORITY STATEMENT

This application is the national phase under 35 U.S.C. §371 of PCT International Application No. PCT/EP2011/057607 which has an International filing date of May 11, 2011, which designated the United States of America and which claims priority to German patent application number DE 10 2010 039 394.0 filed Aug. 17, 2010, the entire contents of each of which are hereby incorporated herein by reference.

FIELD

At least one embodiment of the invention generally relates to a variable-pitch propeller or repeller having a hub with propeller or repeller blades of variable pitch fastened thereto and having a pitch adjusting facility for changing the pitch of the blades. At least one embodiment of the invention further generally relates to a nacelle drive with such a variable-pitch propeller and a wind energy system with such a variable-pitch repeller.

BACKGROUND

Floating or submersible facilities, such as ships or wind energy systems for example, can be exposed to highly variable operating conditions. Such highly variable operating conditions may be for example different thrust and speed requirements, as are present when a ship travels through ice and freely. When travelling through ice a relatively high level of thrust is required at low speed (or rate of advance) and when travelling freely a relatively low level of thrust is required at high speed (or rate of advance). Highly variable operating conditions can for example also be due to very different load states or usage profiles (e.g. patrol speed and cruise speed in the case of a ship). Another example is the (load-free) switching of a propeller from sail position to propulsion position in the case of a sailing ship.

When ships are operating in ice the entire output of the drive machine is generally required for forward movement. The output of the machine here is determined by the product of speed and torque. When travelling through ice, in order to be able to supply the maximum output to overcome the resistance produced by the ice, the speed of the motor should be selected so that a maximum output is achieved. In the case of an electric motor this is generally achieved at maximum speed (without field-weakening mode). This means that the propeller is designed or set for a low rate of advance in the water at maximum motor speed (without field-weakening mode). For free travel, in other words travel on open sea or lake, it is then barely possible to increase speed, particularly in the case of permanent-field electric motors. This means that only low speeds can be achieved even during free travel.

To resolve this problem DE 101 357 11 A1 discloses a drive train for a shaft system of an ice-breaking ship or one that travels in ice, wherein an internal combustion engine is present, to the output shaft of which a step-down gearing system is connected, which acts on a propeller shaft on the output side, and a rotor of an electric generator connected to the output shaft of the internal combustion engine is also present. When traveling through ice the propeller pitch is scaled back and the electric load of the generator is reduced. These measures prevent the motor speed dropping below a specified value.

A nacelle drive is known from DE 198 347 36 A1, in which a propeller casing is mounted around the drive propeller of the nacelle drive for an ice-free navigation period. The propeller casing is removed during navigation under ice conditions. The power consumption of the propeller is kept constant in casing mode and casing-free mode. To this end the blade pitch of the propeller is enlarged during free travel (i.e. casing mode) and reduced during ice travel (i.e. casing-free mode).

The pitch adjusting facility for adjusting the pitch of the propeller blades in a nacelle drive generally comprises—as disclosed for example in WO 2005/021374 A1—a hydraulic drive and regulation facility. However this requires the propeller shaft to be configured as a hollow shaft and hydraulic oil to be introduced into the control and drive lines to the hydraulic adjusting hub disposed in the hollow chamber of the hollow shaft. However there is no space for this in nacelle drives, in particular when an electric drive motor is accommodated in the nacelle housing to drive the propeller shaft and when two propellers are used. There is also the risk of an oil leak in the nacelle housing.

SUMMARY

At least one embodiment of the present invention specifies a variable-pitch propeller or repeller, which can be adjusted to different operating conditions by changing the pitch of the blades with little technical outlay and taking up little space and without the risk of leakage in a component holding it on a facility, e.g. a nacelle housing.

A variable-pitch propeller or repeller is disclosed. Advantageous embodiments of the variable-pitch propeller and repeller are further disclosed. A nacelle drive having such a variable-pitch propeller is also disclosed, along with a wind energy system having such a variable-pitch repeller.

An embodiment of the invention is based on the knowledge that extensive adjustment of the pitch of the blades is often not necessary, since in most instances, particularly in the case of electric propulsion drives or generators, only a numerically limited number of different operating points, often even only just two operating points (for example one operating point for ice travel and one operating point for free travel or one operating point for a large load and one operating point for a small load) has to be mapped by the propeller. If only this numerically limited number of operating points has to be covered, in particular also if switching between the operating points is possible without any load on the propeller or repeller, the structural measures for adjusting the pitch of the blades can be kept simple. A speed under thrust can then largely also be achieved by varying the speed of the drive machine for the propeller shaft, in particular of an electric motor.

The use of just one electric drive facility to move the blades, in particular to move the blades without load on the propeller, and an electrically actuatable locking facility means that the pitch adjusting facility can be configured as relatively small and compact. The use of a locking facility also means that the electric drive facility only has to be activated to adjust the blade pitch. The output and therefore the size of the electric drive facility and its electrical energy requirement can therefore be kept relatively small.

It is therefore possible to dispose the pitch adjusting facility in the hub so that space is not required for it in the interior of a component holding the variable-pitch propeller or repeller, e.g. a nacelle housing. It is even possible to transfer the small amount of electrical energy required by the pitch adjusting facility inductively by way of an energy transfer facility from an interior of the component holding the variable-pitch propeller or repeller (e.g. a nacelle housing) to the pitch adjusting facility in the hub.

According to one particularly compact, space-saving and also structurally simple embodiment, the electric drive facility has a first electric ring motor having an annular rotor and an annular stator, which have the same axis as the rotation axis of the variable-pitch propeller or repeller, and a drive mechanism for converting a rotational movement of the rotor to a rotational movement of the blades about their longitudinal axis.

According to one structurally particularly simple embodiment the drive mechanism comprises a yoke that can move in the direction of the rotation axis. The first electric ring motor can then move the yoke for example by way of a movement thread in the direction of the rotation axis of the propeller or repeller and thus bring about a rotational movement of the blades (e.g. by way of sliding blocks or a suitable rod system).

Alternatively the drive mechanism can also comprise a yoke that can rotate about the rotation axis. If the rotor of the electric ring motor is connected in a torsionally resistant manner to the yoke, a rotation of the rotor can bring about a rotation of the yoke and therefore a rotational movement of the blades (e.g. by way of sliding blocks or a suitable rod system).

The locking system can also have a particularly high level of compactness and also a simple structure, in that the locking facility comprises bolts that can be moved in the direction of the rotation axis and the rotor of the first ring motor has openings to accommodate the bolts.

According to one structurally particularly simple and space-saving embodiment for electrical actuation the locking facility here comprises a second electric ring motor having an annular stator and an annular rotor, which have the same axis as the rotation axis of the variable-pitch propeller or repeller, and a drive mechanism for converting a rotational movement of the rotor to a movement of the bolts in the direction of the rotation axis.

According to one alternative structurally very simple embodiment the electric drive facility can also have at least one electric linear motor having a rotor and a stator and a drive mechanism for converting a linear movement of the rotor to a rotational movement of the blades about their longitudinal axis.

The locking facility can then have a disk, which can be rotated in the peripheral direction of the rotation axis of the variable-pitch propeller or repeller, to fix the drive mechanism or linear motor in respect of a movement in the direction of the rotation axis.

Because of the small energy requirement of the pitch adjusting facility, the pitch adjusting facility advantageously comprises an energy transfer facility for the inductive transfer of electrical energy from outside the propeller or repeller (for example from an interior of a component holding the variable-pitch propeller, e.g. a nacelle housing) to the pitch adjusting facility. The energy transfer facility can be configured for example in the form of a generator with the same axis as the rotation axis of the variable-pitch propeller or repeller, the stator part of which is disposed in an interior of the component, e.g. the nacelle housing, and is energized for the duration of the blade adjustment, while the rotor part supplying the pitch adjusting facility circulates with the hub.

To achieve a particularly low electrical energy consumption, the pitch adjusting facility is preferably configured in such a manner that during an as far as possible load-free (in other words the drive motor or generator outputs no power and consumes none) movement of the blades by the electric drive facility, the locking facility is deactivated and when the blade pitch is locked by the locking facility, the electric drive facility is deactivated.

A variable-pitch propeller as described above can in principle be used for any type of drive system for floating or submersible facilities, for example for conventional shaft systems and broadside systems. One particularly advantageous application is the application for a sailing ship with (load-free) switching from a sail position to a propulsion position.

However there are preferred uses wherever a propeller or repeller shaft with the variable-pitch propeller or repeller disposed thereon is supported in a nacelle-type housing, with the result that the use of a hydraulic pitch adjusting facility for the propeller or repeller blades is problematic. This is the case primarily for nacelle drives for floating facilities and in nacelles of wind energy systems.

An inventive nacelle drive for driving a floating facility of an embodiment then comprises an underwater housing having a propeller shaft supported in a rotatable manner therein and a variable-pitch propeller as described above disposed on one end of the propeller shaft.

According to one particularly advantageous embodiment, the nacelle drive has an electric motor disposed in the housing to drive the propeller shaft. The electric motor here is preferably configured as a permanent-magnet motor.

The nacelle drive can also have a further variable-pitch propeller as described above disposed on the other end of the propeller shaft. The two propellers here can rotate in the same direction or in opposing directions.

An inventive wind energy system of an embodiment comprises a nacelle housing having a repeller shaft supported rotatably therein and a variable-pitch repeller as described above disposed on one end of the repeller shaft.

BRIEF DESCRIPTION OF THE DRAWINGS

The invention and further advantageous embodiments of the invention according to features of the subclaims are described in more detail based on example embodiments in the figures, in which:

DETAILED DESCRIPTION OF THE EXAMPLE EMBODIMENTS

Figure 1:
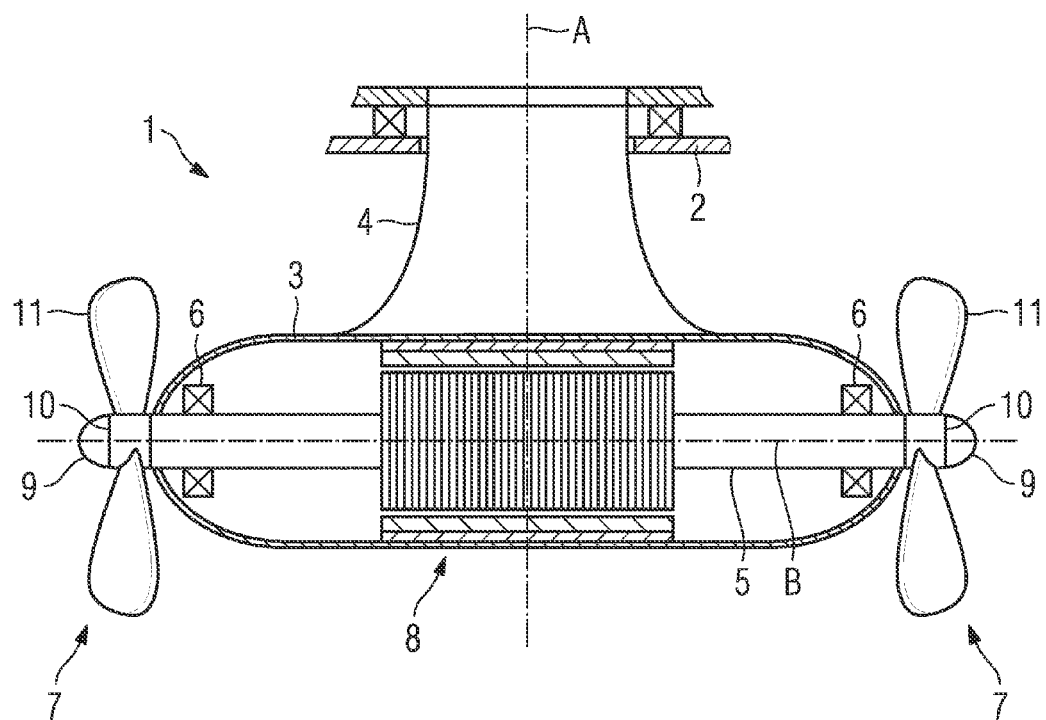
FIG. 1 shows a nacelle drive having an inventive variable-pitch propeller of an embodiment.

FIG. 1 shows a simplified and schematic diagram of a partial longitudinal section through a nacelle drive 1, which serves as a drive facility for a floating or submersible facility, e.g. a ship or offshore platform and to this end is fastened to the rear 2 of the floating facility in such a manner that it can rotate about an axis A. Such a nacelle drive is frequently also referred to as a rudder propeller, thruster or pod drive and usually has a drive output of 0.5 to 30 MW.

The nacelle drive 1 includes a nacelle-type underwater housing 3, which is embodied in a hydrodynamically optimized manner and is disposed on the rear 2 of the floating or submersible facility in such a manner that it can rotate by means of a shaft 4. A propeller shaft 5 is supported within the housing 3 in such a manner that it can rotate by means of bearings 6 and projects out of the housing 3. A variable-pitch propeller 7 disposed outside the housing 3 rests respectively on both ends of the propeller shaft 5. The propeller shaft 5 is driven by an electric motor 8, which is also disposed within the housing 3.

In this example embodiment the two variable-pitch propellers 7 are driven in the same direction by the motor 8. However other embodiments are also possible. For example the two propellers 7 can also be driven in opposing directions by means of a gearing system disposed in the underwater housing 3. Instead of a single electric motor 8 two electric motors can be disposed back to back in the underwater housing 3, each driving just one of the two propellers 7 by way of a propeller shaft. A nacelle drive having just a single propeller is also possible.

The electric motor for driving the propeller shaft 5 can also be located outside the housing 3 in the interior of the floating or submersible facility and can be coupled by way of a gearing system (e.g. a crown wheel-bevel gear system) and a vertical shaft running through the shaft 4 can be coupled to the propeller shaft 5 (so-called L arrangement or Z arrangement).

The propeller shaft 5 has a propeller hub 9 at each of its two ends with an adjusting facility 10 for the pitch of the propeller blades 11 of the propellers 7. The pitch adjusting facility 10 allows the pitch of the propeller blades 11 to be set, here for example for just two different operating points of the floating facility (for example ice travel and free travel). The pitch adjusting facility 11 is therefore configured so that it only allows just two different blade pitches.

The precise structure of the pitch adjusting facility 10 is now described in more detail with reference to FIG. 2. The pitch adjusting facility 10 comprises an electric drive facility 20 for moving the blades 11 from the blade pitch for ice travel to the blade pitch for free travel and back and an electrically actuatable locking facility 40 for locking the blades 11 in the respective blade pitch.

Each propeller blade 11 has an adjusting plate 25 at its foot, which is supported in the hub 9 in a manner not shown in more detail so that it can be rotated in such a manner that the propeller blade 11 can be rotated about its longitudinal axis and the pitch of the propeller blade 11 can thus be changed.

The electric drive facility 20 includes a first electric ring motor 21 (frequently also referred to as a RIM drive), having an annular stator 22 and an annular rotor 23, supported by way of bearings 37 in a rotatable manner in a housing 26 of the adjusting hub 9, said stator 22 and rotor 23 having the same axis as the propeller shaft 5 or the rotation axis B of the variable-pitch propeller 7, and a drive mechanism 24 for converting a rotational movement of the rotor 23 to a rotational movement of the propeller blades 7 about their longitudinal axis. The drive mechanism 24 includes a yoke 27, which is located in the interior of the housing 26 of the adjusting hub 9 and can be moved in the direction of the rotation axis B of the propeller shaft between a first position C and a second position D, and the adjusting plate 25 described above.

The yoke 27 here is supported in a torsionally resistant manner in the housing 26 in respect of the rotation axis B (e.g. by means of slide rails). The annular rotor 23 has a thread 28 on the inside of its ring, said thread 28 engaging with an external thread 29 of the yoke 27 in such a manner that a movement of the rotor 23 about the rotation axis B produces a movement of the yoke 27 in the direction of the rotation axis B. Depending on the rotation direction of the rotor 23, the yoke 27 is moved either toward the ring motor 21 or away from the ring motor 21.

Each adjusting plate 25 for the propeller blades has a carrier 30, which projects into an optionally radially peripheral guide 31 present in the yoke 27 (e.g. with slide elements). A movement of the yoke 27 in the direction of the rotation axis B therefore produces a rotation of the adjusting plates 25 and therefore a change in the pitch of the propeller blades 11.

A distance H between the yoke 27 and the rotor 23 defines a lift for the movement of the yoke 27. When the yoke 27 is in the illustrated first position C with maximum lift, the adjusting plates 25 and therefore the propeller blades 11 are in a first position, which corresponds for example to the position for ice travel. However when the lift is zero, in other words the end face of the yoke 37 rests on the rotor 23 and the yoke 37 is in the second position D, the adjusting plates 25 and the propeller blades 11 are in a second position, which corresponds for example to the position for free travel.

After a movement of the yoke 27 to the first or second position C or D, the yoke 27 is locked in said respective position by a locking facility 40 to prevent movement about the axis B and also in the direction of the axis B. In the direction of the rotation axis B of the propeller shaft 5 the locking facility 40 includes movable bolts 41 and openings or holes 42 present in the rotor 23 of the first ring motor 21 to accommodate the bolts 41. For the purpose of electrically actuated locking the locking facility 40 includes a second electric ring motor 43 having an annular stator 44 and an annular rotor 45, which have the same axis as the propeller shaft 5 or the rotation axis B, and a drive mechanism 46 for converting a rotational movement of the rotor 45 to a movement of the bolts 41 in the direction of the rotation axis B of the propeller shaft 5.

The drive mechanism therefore comprises a ring 47, which is supported on the yoke 27 in a torsionally resistant manner in respect of the yoke 27 (e.g. by way of slide rails) and on which the bolts 41 are disposed in a regularly distributed manner.

On the inside of its ring the annular rotor 45 has a thread 48, which engages with an external thread 49 of the ring 47 in such a manner that a movement of the rotor 45 about the rotation axis B produces a movement of the ring 47 and therefore of the bolts 41 in the direction of the rotation axis B. Depending on the rotation direction of the rotor 45 the ring 47 with the bolts 41 is moved either toward the ring motor 21 or away from the ring motor 21.

Figure 2:
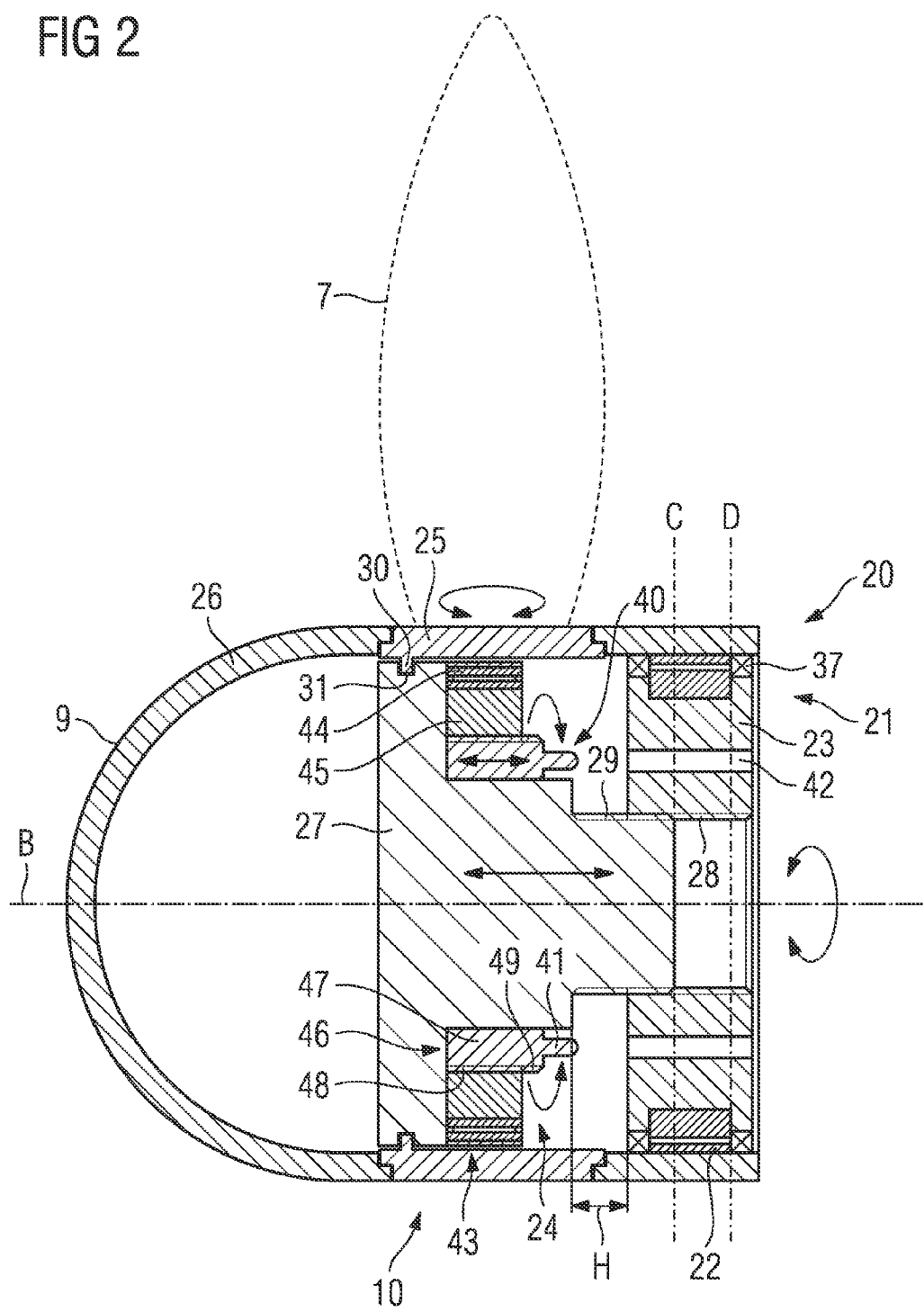
FIG. 2 shows a detailed view of the pitch adjusting facility from FIG. 1

The second ring motor 43 can therefore be used to move the bolts 41 in the direction of the rotation axis B from a first position illustrated in FIG. 2, in which they are outside the holes 42, to a second position, in which they are accommodated with a form fit by the holes 42, or vice versa. Such a form fit means that the yoke 27 and the blades are fixed and locked with their respective blade pitch.

The pitch adjusting facility 10 here is configured so that when the blades are moved by the electric drive facility 20, the locking facility 40 is deactivated and therefore no electrical energy is consumed and conversely, when the blade pitch is locked by the locking facility 40, the electric drive facility 20 is deactivated and therefore no electrical energy is consumed. Electrical energy consumption can therefore be kept very low. It is therefore possible to transfer the electrical energy inductively to the pitch adjusting facility 10.

To this end the nacelle drive 1 comprises an energy transfer facility (not shown in greater detail) for the inductive transfer of electrical energy from an interior of the nacelle housing 3 to the pitch adjusting facility 10. The person skilled in the art has a number of commonly used options for this purpose, for example a coil pair (in each instance a coil disposed in the adjusting hub 9 and a coil disposed in the interior of the nacelle housing 3, the latter being energized with alternating current) can be present for each of the ring motors 21, 43 for energy transfer purposes.

The energy requirement and space requirement of the ring motors 21, 43 can be even further reduced here, if the ring motors 21, 43 have a permanent-magnet rotor.

For the ring motors to have the lowest possible electrical energy requirement, the blade pitch is preferably not changed with a propeller load but in a load-free operating state, in other words only driven by the water flow passing the propeller.

A large number of other possible embodiments of course also exist for the drive facility 20 and the locking facility 40. For example instead of electric ring motors, conventional electric motors and drive mechanisms based on gearwheels can also be used.

The drive mechanism can also include a yoke that can be rotated about the rotation axis of the propeller shaft. When the rotor of the electric ring motor is connected in a torsionally resistant manner to the yoke, a rotation of the rotor can bring about a rotation of the yoke and therefore a rotational movement of the propeller blades.

Alternatively the electric drive facility can also have at least one electric linear motor having a rotor and a stator and a drive mechanism for converting a linear movement of the rotor to a rotational movement of the propeller blades about their longitudinal axis. The locking facility can then have a disk that can be rotated in the peripheral direction of the rotation axis of the propeller shaft to fix the drive mechanism or the linear motor in respect of a movement in the direction of the rotation axis of the propeller shaft.

Figure 3:
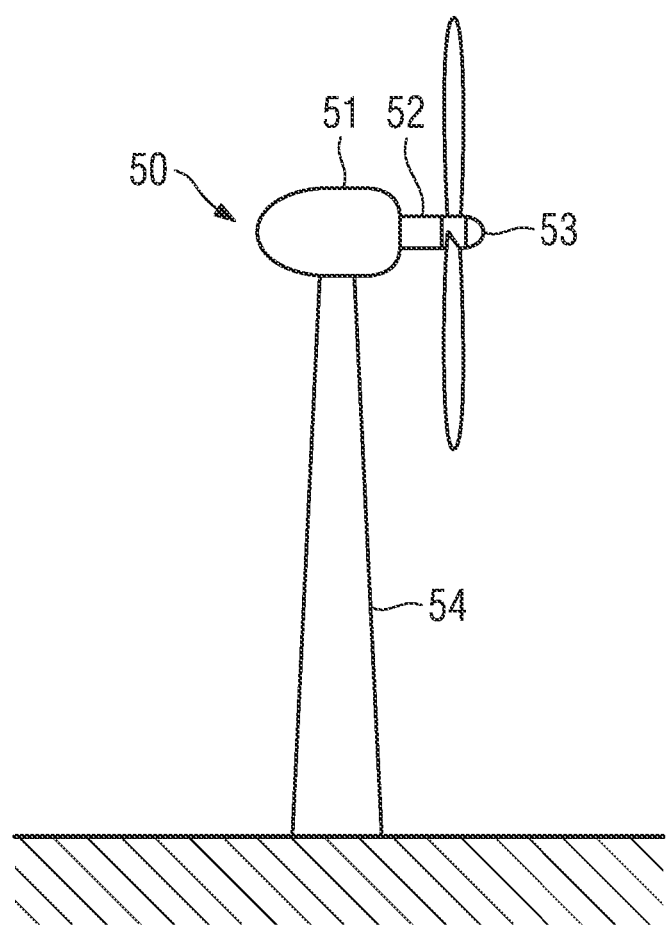
FIG. 3 shows a wind energy system having an inventive variable-pitch repeller of an embodiment.

FIG. 3 shows a simplified diagram of a wind energy system 50 having a tower 54, on which a nacelle housing 51 is positioned, in which a repeller shaft 52 is supported rotatably and drives a generator. Disposed at one end of the repeller shaft 52 is a variable-pitch repeller 53, the basic structure of which is identical to the variable-pitch propeller for a nacelle drive described in conjunction with FIGS. 1 and 2.

The invention claimed is:

1. A variable-pitch propeller or repeller, comprising:
   a hub, propeller or repeller blades of variable pitch being fastened to the hub; and
   a pitch adjusting facility configured to change the pitch of the propeller or repeller blades, the pitch adjusting facility being disposed in the hub and being configured so as to only allow a numerically limited number of different blade pitches, and the pitch adjusting facility including
      an electric drive facility configured to move the blades from a first to a second of the numerically limited number of blade pitches, and
      an electrically actuatable locking facility configured to lock the blades in the numerically limited number of different blade pitches, wherein the electric drive facility includes
      a first electric ring motor including an annular stator and an annular rotor, including the same axis as the rotation axis of the variable-pitch propeller or repeller, and
      a drive mechanism configured to convert a rotational movement of the rotor to a rotational movement of the blades about their longitudinal axis and, wherein the drive mechanism comprises a yoke, movable in the direction of the rotation axis.

2. A variable-pitch propeller or repeller, comprising: a hub, propeller or repeller blades of variable pitch being fastened to the hub; and
   a pitch adjusting facility configured to change the pitch of the propeller or repeller blades, the pitch adjusting facility being disposed in the hub and being configured so as to only allow a numerically limited number of different blade pitches, and the pitch adjust facility including
      an electric drive facility configured to move the blades from a first to a second of the numerically limited number of blade pitches, and an electrically actuable locking facility configured to lock the blades in the numerically limited number of different blade pitches, wherein the electric drive facility includes
      a first electric ring motor including an annular stator and an annular rotor, including the same axis as the rotation axis of the variable-pitch propeller or repeller, and
      a drive mechanism configured to convert a rotational movement of the rotor to a rotational movement of the blades about their longitudinal axis and, wherein the drive mechanism comprises a yoke, rotatable about the rotation axis.

3. The variable-pitch propeller or repeller of claim 1, wherein the locking facility comprises bolts that are movable in the direction of the rotation axis and wherein the rotor of the first ring motor includes openings to accommodate the bolts.

4. The variable-pitch propeller or repeller of claim 3, wherein, for electrical actuation, the locking facility comprises a second electric ring motor including an annular stator and an annular rotor, including the same axis as the rotation axis of the variable-pitch propeller or repeller, and a drive mechanism configured to convert a rotational movement of the rotor to a movement of the bolts in the direction of the rotation axis.

5. The variable-pitch propeller or repeller of claim 1, wherein the electric drive facility includes at least one electric linear motor including a rotor and a stator, and a drive mechanism configured to convert a linear movement of the rotor to a rotational movement of the blades about their longitudinal axis.

6. The variable-pitch propeller or repeller of claim 5, wherein the locking facility includes a disk, rotatable in the peripheral direction of the rotation axis, to fix the drive mechanism or linear motor in respect of a movement in the direction of the rotation axis.

7. The variable-pitch propeller or repeller of claim 1, further comprising an energy transfer facility for the inductive transfer of electrical energy from outside the variable-pitch propeller or repeller to the pitch adjusting facility.

8. The variable-pitch propeller or repeller of claim 1, wherein the pitch adjusting facility is configured so that, when the blades are moved by the electric drive facility, the locking facility is deactivated and when the blade pitch is locked by the locking facility, the electric drive facility is deactivated.

9. A nacelle drive for driving a floating facility, comprising:
   an underwater housing including a propeller shaft supported rotatably therein; and the variable-pitch propeller of claim 1, disposed on one end of the propeller shaft.

10. The nacelle drive of claim 9, further comprising an electric motor, disposed in the housing, configured to drive the propeller shaft.

11. The nacelle drive of claim 10, wherein the electric motor is configured as a permanent-magnet motor.

12. The nacelle drive of claim 9, further comprising a further variable-pitch propeller, disposed on the other end of the propeller shaft.

13. A wind energy system comprising:
a nacelle housing including a repeller shaft supported rotatably therein; and
the variable-pitch repeller of claim 1, disposed on one end of the repeller shaft.

14. The variable-pitch propeller or repeller of claim 1, wherein the pitch adjusting facility is configured so as to only allow only two blade pitches.

15. The variable-pitch propeller or repeller of claim 1, wherein the locking facility comprises bolts that are movable in the direction of the rotation axis and wherein the rotor of the first ring motor includes openings to accommodate the bolts.

16. A variable-pitch propeller or repeller, comprising:
a hub, propeller or repeller blades of variable pitch being fastened to the hub; and
a pitch adjusting facility configured to change the pitch of the propeller or repeller blades, the pitch adjusting facility including
an electric drive facility configured to move the blades from a first to a second of blade pitches, and
an electrically actuatable locking facility configured to lock the blades in different blade pitches, wherein the electric drive facility includes
a first electric ring motor including an annular stator and an annular rotor, including the same axis as the rotation axis of the variable-pitch propeller or repeller, and
a drive mechanism configured to convert a rotational movement of the rotor to a rotational movement of the blades about their longitudinal axis, wherein
the locking facility includes bolts that are movable in the direction of the rotation axis and the rotor of the first ring motor includes openings to accommodate the bolts.

* * * * *